Jan. 28, 1964     R. D. LEONI     3,119,454
HYDRAULIC FEATHERING BEARING

Filed Aug. 21, 1961     2 Sheets-Sheet 1

INVENTOR
RAY D. LEONI
BY Jack N. McCarthy
AGENT

Jan. 28, 1964  R. D. LEONI  3,119,454
HYDRAULIC FEATHERING BEARING
Filed Aug. 21, 1961  2 Sheets-Sheet 2
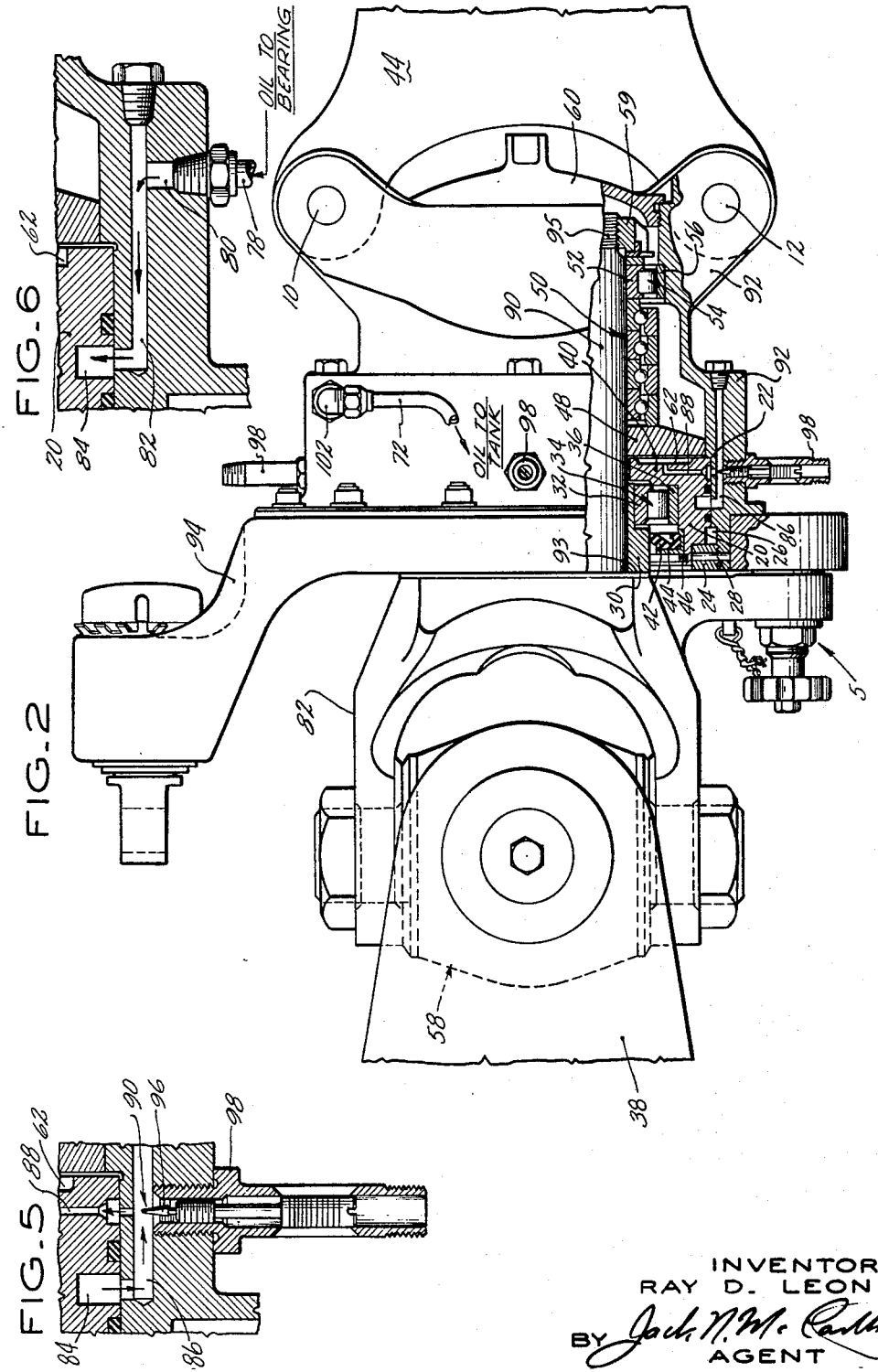
INVENTOR
RAY D. LEONI
BY Jack N. McCarthy
AGENT

United States Patent Office 3,119,454
Patented Jan. 28, 1964

3,119,454
HYDRAULIC FEATHERING BEARING
Ray D. Leoni, Hamden, Conn., assignor to United Aircraft Corporation, East Hartford, Conn., a corporation of Delaware
Filed Aug. 21, 1961, Ser. No. 132,699
13 Claims. (Cl. 170—160.58)

This invention relates to rotary wing aircraft and particularly to improvements in the rotor head construction of such aircraft in which the rotor blades are individually mounted for pitch changing movement.

It is an object of this invention to provide an improved thrust bearing for mounting a rotor blade to absorb centrifugal loads so that simple roller bearings can provide radial support.

Another object of this invention is to provide a hydraulic pitch changing bearing which will provide a satisfactory flow of fluid through said bearing while permitting said blade to move as otherwise required with a minimum of frictional torque.

A further object of this invention is to provide for pitch change movement that can be accomplished easily and accurately.

Another object of this invention is to provide hydraulic pitch changing bearing in which the friction which takes place during a pitch change will be less than the total friction of the ball thrust bearings provided to take the place of the hydraulic bearing in the event of failure of the hydraulic bearing, and the friction produced by the roller bearings between the rotary pad of the hydraulic bearing and the flapping link of the rotor head.

These and other objects and advantages of this invention will become apparent from the following description of the invention shown in the accompanying drawings.

FIG. 2 is an enlarged view of the blade attaching means showing the hydraulic pitch changing bearing in section;

FIG. 5 is an enlarged portion of the hydraulic pitch changing bearing of FIG. 2 showing the annular reservoir and needle control valve; and FIG. 6 is an enlarged portion of the hydraulic pitch changing bearing showing the flow of fluid to the annular reservoir, this view is taken on line 6—6.

Figure 3:
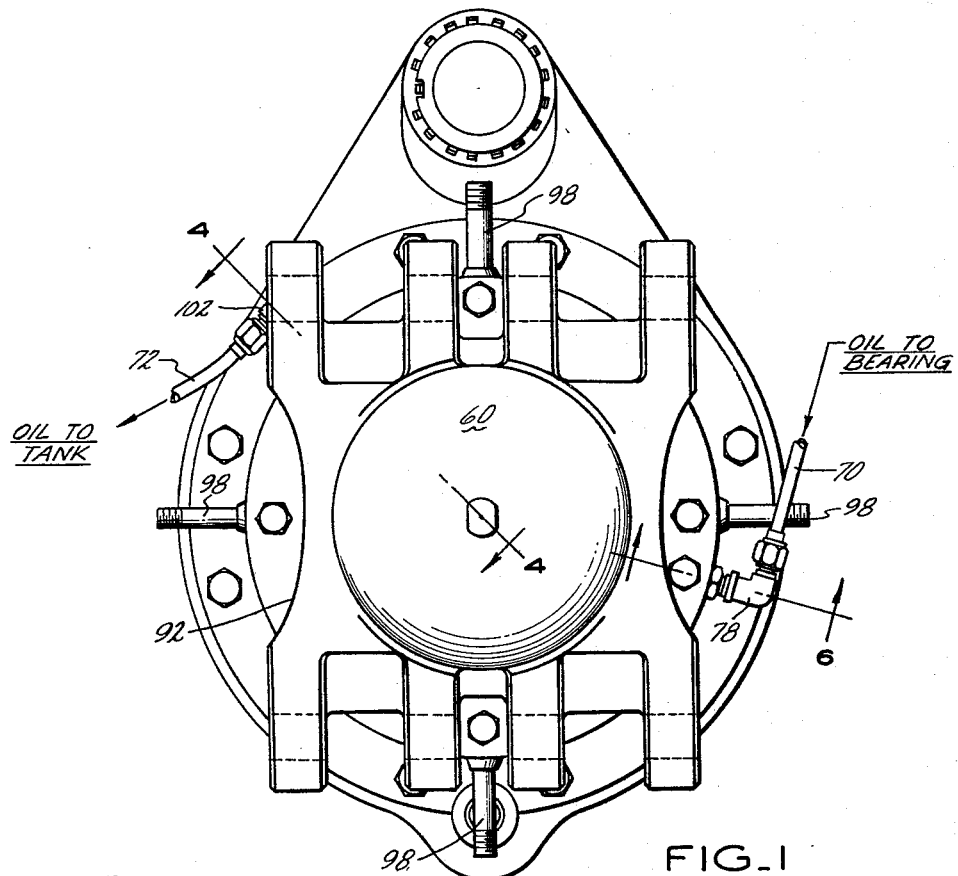
FIG. 3 is an end view of the blade attaching sleeve shown in FIG. 2.
Figures 1, 4:
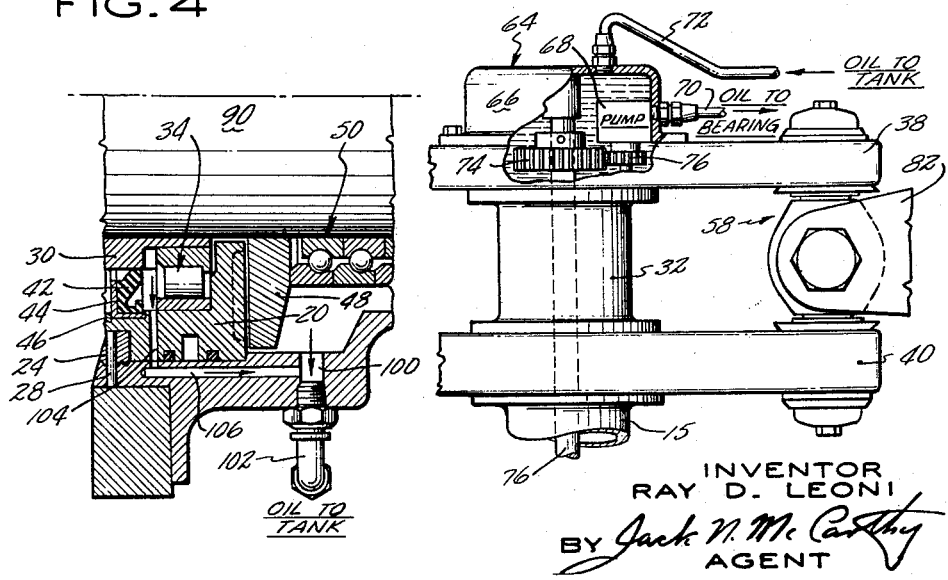
FIG. 1 is a side view of a portion of the rotor head showing a blade hinge attachment along with the liquid supply for the hydraulic pitch changing bearing.
FIG. 4 is a view of a portion of the hydraulic pitch changing bearing showing the flow of fluid from said bearing, this view is taken approximately along the line 4—4 of FIG. 3.

With reference to FIG. 1, the rotor head shown is similar to the rotor head set forth in U.S. Patent No. 2,638,994 to Mr. Buivid, issued May 19, 1953. In instant application the upper and lower spaced plates 38 and 40 have a separating member 32 therebetween. A driving shaft 15 is fixed to the lower part of plate 40. A drag hinge 58 is journaled for rotation between the upper and lower plates 38 and 40, respectively, for each blade. A flapping link 82 is pivotally mounted to each drag hinge 58. The free end of the flapping link is formed as a spindle 90. An annular abutment 93 is formed around the inboard base of the spindle and the outboard end of the spindle is threaded at 95.

A blade-attaching sleeve 92 is mounted on each spindle 90 for rotation. This provides for the changing of the pitch of each blade. A blade 44 is attached to each blade-attaching sleeve by pins 10 and 12 which extend through intermeshing bosses on the outboard end of the blade-attaching sleeve and the inboard end of the blade.

The inboard end of the blade-attaching sleeve has an inboard bearing pad 20 fixed therein by an abutment 22 and an annular nut 24 which is threaded in the inboard opening of the blade-attaching sleeve 92. A key 26 is positioned in a recess in the inboard bearing pad 20 and a mating recess in the inner surface of the blade-attaching sleeve 92 to prevent rotation between these two members. The annular nut 24 is tightened to its proper position to maintain the inboard bearing pad 20 and the blade-attaching sleeve 92 against axial movement and to also hold the key 26 in place. A pin 28 extends between the annular nut 24 and the blade-attaching sleeve 92 to fix the nut against rotation relative to the sleeve. A locking device 5 is provided which can lock the flapping link 82 to the blade-attaching sleeve whenever necessary such as for blade folding.

A spacer 30 is positioned over the spindle 90 and one end abuts the annular abutment 93. The outboard end of the spacer 30 is of a reduced diameter and the inner ring 32 of a roller-bearing assembly 34 is positioned thereon. The outer ring 36 of the roller-bearing assembly 34 is positioned in a cylindrical portion formed in the inboard bearing pad 20. The outboard face of the inboard bearing pad 20 extends from the inner surface of the blade-attaching sleeve to a point just short of the spindle 90. This face extends inwardly on an inwardly projecting annular flange 40. The inboard surface of this flange is formed abutting the outboard surface of the outer ring 36 of the roller-bearing assembly 34. The end of the flange adjacent spindle 90 is cut away at its inboard side so that it does not engage the outboard end of the inner ring 32 of the roller-bearing assembly 34.

An annular seal 42 is positioned in a seal-holding member 44. The seal-holding member 44 is fixedly mounted within the inner end of the inboard bearing pad 20 between an abutment on the pad 20 and a snap ring 46 which engages the pad 20. The seal 42 engages the inboard portion of the spacer 30.

An outboard bearing pad 48 mounted within the blade-attaching sleeve 92 with its inboard face adjacent to the outboard face of the inboard bearing pad 20. Its inner end is positioned adjacent the spindle 90. A ball bearing assembly 50 is positioned over the spindle 90. In FIG. 2 the bearing assembly is shown as a group of four ball bearings. The inboard surface of the outer rings of the ball bearings engages the outboard surface of the outboard bearing pad 48, and the outboard surface of the inner rings abuts the inner ring 52 of the roller-bearing assembly 54. The outer ring 56 of the roller-bearing assembly 54 is positioned on a built up part on the interior of the blade-attaching sleeve. This outer ring 56 also has its outboard outer face positioned against an annular abutment formed on the inside of the blade-attaching sleeve 92. A plane washer and a lock washer appear in that order over the free end of the spindle 90 with the inboard face of the washer abutting the outboard face of the inner ring of the bearing assembly 54. An annular nut 59 is threadably mounted on the portion 95 of the spindle 90. After it had been positioned in its proper location, the lock washer is bent so that a portion extends into a groove on the annular nut 59. A cap 60 is fixed over the open outboard end of the blade-attaching sleeve 92.

The outboard face of the inboard bearing pad 20 is formed having four arcuate recesses 62. Each recess takes up approximately a quarter segment of the face. These recesses are not connected on the face. A bearing fluid is directed to each of the recesses 62 and is drained therefrom by a system to be hereinafter disclosed. A fluid reservoir 64 is provided on the upper plate 38 between a cover plate 66 and a recess in the upper plate. A pump 68 is fixed within said reservoir having an inlet in connection with the fluid within the reservoir. The outlet of the pump is connected to a conduit 70 which directs fluid to the recesses 62 which cooperate with each blade 44. The fluid is returned to the reservoir through a conduit 72. Pump 68 is driven by a gear 74 which is fixedly mounted within the reservoir 64 on a shaft 76 which is fixed in turn to helicopter structure. The shaft 76 is sealed to prevent leakage thereby. The fixed gear 74 meshes with a gear 76 which is the driving gear for the pump 68. It can be seen that, as the rotor head rotates, the pump 68 rotates with it. This movement provides for rotation of the axis of the gear 76 about the axis of the gear 74, and in effect, walks the gear 76 about the gear 74.

Since each blade connecting means is the same, only one will be discussed with reference to the fluid supply system. Conduit 70, carrying fluid from the pump 68, is connected to an elbow section 78 which in turn has its other end connected to a passageway 80 in the blade-attaching sleeve 92. Passageway 80 is connected to a passageway 82 which is directed to an annular reservoir 84 located in the inboard bearing pad 20. An O ring is positioned on each side of the annular reservoir 84 where the surfaces of the inboard bearing pad 20 and the blade-attaching sleeve 92 engage (see FIG. 6).

Fluid is directed to the pads 62 from the annular reservoir 84 by passageways 86 and 88. The passageway 86 is formed in the blade-attaching sleeve 92 and the passageway 88 is formed in the inboard bearing pad 20.

Valve means 90 is provided in each of the passageway connections between the reservoir 84 and each recess 62. This valve means 90 is provided having a tapered pin 96 arranged to cooperate with a portion of the passageway and control its cross-sectional area. A valve casing 98 is fixedly positioned on the blade-attaching sleeve for each of the four tapered pins 96. The tapered pin 96 is movably mounted in the valve casing 96 to provide for variably changing the cross-sectional area of the passageway 86. Each of the valve means for the four recesses 62 is adjusted to achieve the proper flow of fluid to the pads to provide for the desired bearing movement pressure drop and spacing between the faces of the pads 20 and 48. Markings on the stems of the tapered pin 96 indicate the position of the pin in the casing. They are viewed through an opening in the casing.

Fluid can pass from between the mating faces of the inboard and outboard bearing pads 20 and 48. Fluid which passes the outboard bearing pad 48 enters the chamber formed within the blade-attaching sleeve. The ball bearing assembly 50 is located in the chamber. A passageway 100 connects this chamber to one end of an elbow section 102 which extends to the exterior of the blade-attaching sleeve. The other end of the elbow 102 is connected to conduit 72.

Fluid which passes the inboard bearing pad 20 is directed to the roller bearing assembly 34, from the roller bearing assembly 34 the fluid encounters the annular seal 42. This space between the annular seal 42 and the roller bearing assembly 34 is connected to the passageway 100 by a passageway 104 in said inboard bearing pad 20 and a passageway 106 located in the blade-attaching sleeve 92.

When this system is operating, the pump 68 pumps bearing fluid to the annular reservoir 84. This is done by pumping the fluid from the outlet of pump 68 through conduit 70, elbow section 78, and passageways 80 and 82. The fluid for each recess 62 is directed from the reservoir 84 by its own passageways 86 and 88. The flow through each set of passageways is controlled by a valve or restricting means 90. This valve means governs the flow in the fluid pressure bearing to properly position the faces of the inner bearing pad 20 and the outer bearing pad 48 to give the desired thrust bearing action.

Bearing fluid which passes the outer bearing pad 48 is returned through the passageway 100, elbow section 102 and conduit 72 to the reservoir 64. The fluid which passes the inner bearing pad 20 is returned to passageway 100 through passageways 104 and 106, from this point the fluid follows the same return passage to the reservoir just referred to.

With the hydraulic bearing system in operation relative movement between the blade 44 and its flapping hinge 82 is made between the faces of the inner bearing pad 20 and the outer bearing pad 48. In this normal operation the ball bearing assembly 50 acts as a fixed member. However, if hydraulic bearing pressure fails, the opposed faces of the inboard and outboard bearing pads will become engaged and the rotation between the blade 44 and the flapping link 82 will take place through the ball bearing assembly 50. This operation will allow the pilot sufficient time to land the aircraft without any loss of safety.

It is to be understood that the invention is not limited to the specific description above or other specific figures, but may be used in other ways without departure from its spirit as defined by the following claims.

I claim:

1. In a rotary wing aircraft, a rotor head, means projecting from said rotor head, said projecting means including a spindle, a blade attaching sleeve, said blade attaching sleeve being mounted for rotation on said spindle, a first annular bearing pad positioned on said spindle against outboard axial movement and extending radially outwardly therefrom, a bearing means located between said first annular bearing pad and said spindle, a second annular bearing pad fixed to said blade attaching sleeve and extending radially inwardly, said first annular bearing pad having a first face directed towards said rotor head, said second annular bearing pad having a second face positioned adjacent said first face, and means maintaining a thickness of fluid between said first and second faces.

2. In a rotary wing aircraft, a rotor head, means projecting from said rotor head, said projecting means including a spindle, a blade attaching sleeve, said blade attaching sleeve being mounted for rotation on said spindle, a first annular bearing pad positioned on said spindle against outboard axial movement and extending radially outwardly therefrom, bearing means located between said first annular bearing pad and said spindle, a first annular bearing pad fixed to said blade attaching sleeve and extending radially inwardly, said first annular bearing pad having a first face directed towards said rotor head, said second annular bearing pad having a second face positioned adjacent said first face, and means maintaining a thickness of fluid between said first and second faces so that the friction between the first and second faces is less than the friction in said bearing means.

3. In a rotary wing aircraft, a rotor head, means projecting from said rotor head, said projecting means including a spindle, a blade attaching sleeve, said blade attaching sleeve being mounted for rotation on said spindle, a first annular bearing pad positioned on said spindle against outboard axial movement and extending radially outwardly therefrom, bearing means located between said first annular bearing pad and said spindle, a second annular bearing pad fixed to said blade attaching sleeve and extending radially inwardly, said first annular bearing pad having a first face directed towards said rotor head, said second annular bearing pad having a second face positioned adjacent said first face, and means connected to said blade attaching sleeve maintaining a thickness of fluid between said first and second faces.

4. In a rotary wing aircraft, a rotor head, means projecting from said rotor head, said projecting means including a spindle, a blade attaching sleeve, said blade attaching sleeve being mounted for rotation on said spindle, a first annular bearing pad positioned on said spindle against outboard axial movement and extending radially outwardly therefrom, bearing means located between said first annular bearing pad and said spindle, a second annular bearing pad fixed to said blade attaching sleeve and extending radially inwardly, said first annular bearing pad having a first face directed towards said rotor head, said second annular bearing pad having a second face positioned adjacent said first face, a reservoir formed between said second annular bearing pad and said blade attaching sleeve, means directing a fluid to said reservoir, means directing fluid from said reservoir to said second face to maintain a thickness of fluid between said first and second faces.

5. In a rotary wing aircraft, a rotor head, means projecting from said rotor head, said projecting means including a spindle, a blade attaching sleeve, said blade attaching sleeve being mounted for rotation on said spindle, a first annular bearing pad positioned on said spindle against outboard axial movement and extending radially outwardly therefrom, bearing means located between said first annular bearing pad and said spindle, a second annular bearing pad fixed to said blade attaching sleeve and extending radially inwardly, said first annular bearing pad having a first face directed towards said rotor head, said second annular bearing pad having a second face positioned adjacent said first face, and means maintaining a thickness of fluid between said first and second faces, said last named means including a main reservoir located on said rotor head and conduit means connecting said reservoir to said second face.

6. In a rotary wing aircraft, a rotor head, means projecting from said rotor head, said projecting means including a spindle, a blade attaching sleeve, said blade attaching sleeve being mounted for rotation on said spindle, a first annular bearing pad positioned on said spindle against outboard axial movement and extending radially outwardly therefrom, first bearing means located between said first annular bearing pad and said spindle, a second annular bearing pad fixed to said blade attaching sleeve and extending radially inwardly, second bearing means located between said second annular bearing pad and said spindle, said first annular bearing pad having a first face directed towards said rotor head, said second annular bearing pad having a second face positioned adjacent said first face, and means maintaining a thickness of fluid between said first and second faces.

7. In a rotary wing aircraft, a rotor head, means projecting from said rotor head, said projecting means including a spindle, a blade attaching sleeve, said blade attaching sleeve being mounted for rotation on said spindle, a first annular bearing pad positioned on said spindle against outboard axial movement and extending radially outwardly therefrom, first bearing means located between said first annular bearing pad and said spindle, a second annular bearing pad fixed to said blade attaching sleeve and extending radially inwardly, second bearing means located between said second blade attaching sleeve and said spindle, said first annular bearing pad having a first face directed towards said rotor head, said second annular bearing pad having a second face positioned adjacent said first face, and means maintaining a thickness of fluid between said first and second faces, said last named means including a pump directing fluid to said second face and passage means returning the fluid from between said first and second faces to said pump.

8. In a rotary wind aircraft, a rotor head, means projecting from said rotor head, said projecting means including a spindle, a blade attaching sleeve positioned around said spindle, first bearing means located between the outer end of said spindle and said blade attaching sleeve to provide for rotation, thrust bearing means located around said spindle and adjacent said first bearing means, a first annular bearing pad positioned on said spindle adjacent said thrust bearing means, a second annular bearing pad fixed to said blade attaching sleeve and extending inwardly therefrom, second bearing means located between said second annular bearing pad and said spindle, said first annular bearing pad having a first face directed towards said second annular bearing pad, said second annular bearing pad having a second face positioned adjacent said first face, and means maintaining a thickness of fluid between said first and second faces, said last-named means including a pump directing fluid to said second face and passage means returning the fluid from between said first and second faces to said pump.

9. In a rotary wing aircraft, a rotary head, means projecting from said rotor head, said projecting means including a spindle, a blade attaching sleeve positioned around said spindle, first bearing means located between the outer end of said spindle and said blade attaching sleeve to provide for rotation, thrust bearing means located around said spindle and adjacent said first bearing means, a first annular bearing pad positioned on said spindle adjacent said thrust bearing means, a second annular bearing pad fixed to said blade attaching sleeve and extending inwardly therefrom, second bearing means located between said second annular bearing pad and said spindle, said first annular bearing pad having a first face directed towards said second annular bearing pad, said second annular bearing pad having a second face positioned adjacent said first face, an annular reservoir in said second annular bearing pad, a plurality of passageways connecting said annular reservoir to said second face, and means directing a fluid to said annular reservoir to maintain a thickness of fluid between said first and second faces, said last-named means including a pump and passage means returning the fluid from between said first and second faces to said pump.

10. In a rotary wing aircraft, a rotor head, means projecting from said rotor head, said projecting means including a spindle, a blade attaching sleeve positioned around said spindle, first bearing means located between the outer end of said spindle and said blade attaching sleeve to provide for rotation, thrust bearing means located around said spindle and adjacent said first bearing means, a first annular bearing pad positioned on said spindle adjacent said thrust bearing means, a second annular bearing pad fixed to said blade attaching sleeve and extending inwardly therefrom, second bearing means located between said second annular bearing pad and said spindle, said first annular bearing pad having a first face directed towards said second annular bearing paid, said second annular bearing pad having a second face positioned adjacent said first face, an annular reservoir in said second annular bearing pad, a plurality of passageways connecting said annular reservoir to said second face, and means directing a fluid to said annular reservoir to maintain a thickness of fluid between said first and second faces, said last-named means including a second reservoir, a pump for pumping fluid therefrom, and passage means returning the fluid from between said first and second faces to said second reservoir.

11. In a rotary wing aircraft, a rotor head, means projecting from said rotor head, said projecting means including a spindle, a blade attaching sleeve positioned around said spindle, first bearing means having first inner and outer rings being located between the outer end of said spindle and said blade attaching sleeve to provide for rotation, thrust bearing means having second inner and outer rings located around said spindle and adjacent said first bearing means, the second inner ring abutting the first inner ring, a first annular bearing pad positioned on said spindle adjacent said thrust bearing means, said first annular bearing pad abutting the second outer ring, a second annular bearing pad fixed to said blade attaching sleeve and extending inwardly therefrom, second bearing means located between said second annular bearing pad and said spindle, said first annular bearing pad having a first face directed towards said second annular bearing pad, said second annular bearing pad having a second face positioned adjacent said first face, and means maintaining a thickness of fluid between said first and second faces, said last-named means including a pump directing fluid to said second face, and passage means returning the fluid from between said first and second faces to said pump.

12. In a rotary wing aircraft, a rotor head, means projecting from said rotor head, said projecting means including a spindle, a blade attaching sleeve positioned around said spindle, first bearing means having first inner and outer rings being located between the outer end of said spindle and said blade attaching sleeve to provide for rotation, thrust bearing means having second inner and outer rings located around said spindle and adjacent said first bearing means, the second inner ring abutting the first inner ring, a first annular bearing pad positioned on said spindle adjacent said thrust bearing means, said first annular bearing pad abutting the second outer ring, a second annular bearing pad fixed to said blade attaching sleeve and extending inwardly therefrom, second bearing means located between said second annular bearing pad and said spindle, said first annular bearing pad having a first face directed towards said second annular bearing pad, said second annular bearing pad having a second face positioned adjacent said first face, and means maintaining a thickness of fluid between said first and second faces, said last-named means including a pump for directing fluid to said second face, conduit means connecting said pump to said second face, and passage means returning the fluid from between said first and second faces to said pump.

13. In a rotary wing aircraft, a rotor head, means projecting from said rotor head, said projecting means including a spindle, a blade attaching sleeve positioned around said spindle, first bearing means having first inner and outer rings being located between the outer end of said spindle and said blade attaching sleeve to provide for rotation, thrust bearing means having second inner and outer rings located around said spindle and adjacent said first bearing means, the second inner ring abutting the first inner ring, a first annular bearing pad positioned on said spindle adjacent said thrust bearing means, said first annular bearing pad abutting the second outer ring, a second annular bearing pad fixed to said blade attaching sleeve and extending inwardly therefrom, second bearing means located between said second annular bearing pad and said spindle, said first annular bearing pad having a first face directed towards said second annular bearing pad, said second annular bearing pad having a second face positioned adjacent said first face, and means maintaining a thickness of fluid between said first and second faces, said last-named means including a pump for directing fluid to said second face, conduit means connecting said pump to said second face, valve means in said conduit means for controlling flow therethrough, and passage means returning the fluid from between said first and second faces to said pump.

References Cited in the file of this patent

UNITED STATES PATENTS

| | | |
|---|---|---|
| 1,169,206 | Sydney | Jan. 25, 1916 |
| 1,268,907 | Wintroath | June 11, 1918 |
| 2,319,913 | Bentley | May 25, 1943 |
| 2,404,290 | Hoover | July 16, 1946 |
| 2,570,682 | Imbert | Oct. 9, 1951 |
| 2,638,994 | Buivid | May 19, 1953 |
| 2,941,853 | Bartholomaus | June 21, 1960 |
| 2,948,554 | Mahand | Aug. 9, 1960 |
| 2,983,832 | Macks | May 9, 1961 |

FOREIGN PATENTS

| | | |
|---|---|---|
| 671,693 | Germany | Feb. 11, 1939 |